United States Patent [19]

Davis

[11] 4,288,275

[45] Sep. 8, 1981

[54] ROLL LEAF COATING APPARATUS

[76] Inventor: Jesse B. Davis, 196 So. Kilburn Rd., Garden City, N.Y. 11530

[21] Appl. No.: 38,630

[22] Filed: May 14, 1979

[51] Int. Cl.[3] ........................ B05C 11/02; B29C 27/00

[52] U.S. Cl. ...................................... 156/367; 101/25; 101/DIG. 4; 118/60; 118/68; 156/233; 156/234; 156/238; 156/541; 156/583.3; 156/378; 156/540

[58] Field of Search ........................ 101/8, 25, DIG. 4; 118/60, 68; 156/540, 541, 583.3, 230, 233, 234, 238, 240, 581, 582; 427/428

[56] References Cited

U.S. PATENT DOCUMENTS 3,188,259 6/1965 Leger ................................ 101/25 X 3,915,628 10/1975 Bossard et al. ................. 101/470 X

*Primary Examiner*—Bruce H. Hess

*Attorney, Agent, or Firm*—Robert B. Burns

[57] ABSTRACT

A coating apparatus in which a coating film is transferred from a film carrying roll leaf, onto the surface of a product. A positioning platform, together with a pressure member which acts against the platform, define a transfer station at which the roll leaf and product are concurrently aligned. A continuously moving and guided thermal belt preheats the foil sufficiently to effect separation of the roll leaf decorative layer from the carrier, and assure its transfer to the product surface.

14 Claims, 5 Drawing Figures

FIG. 1
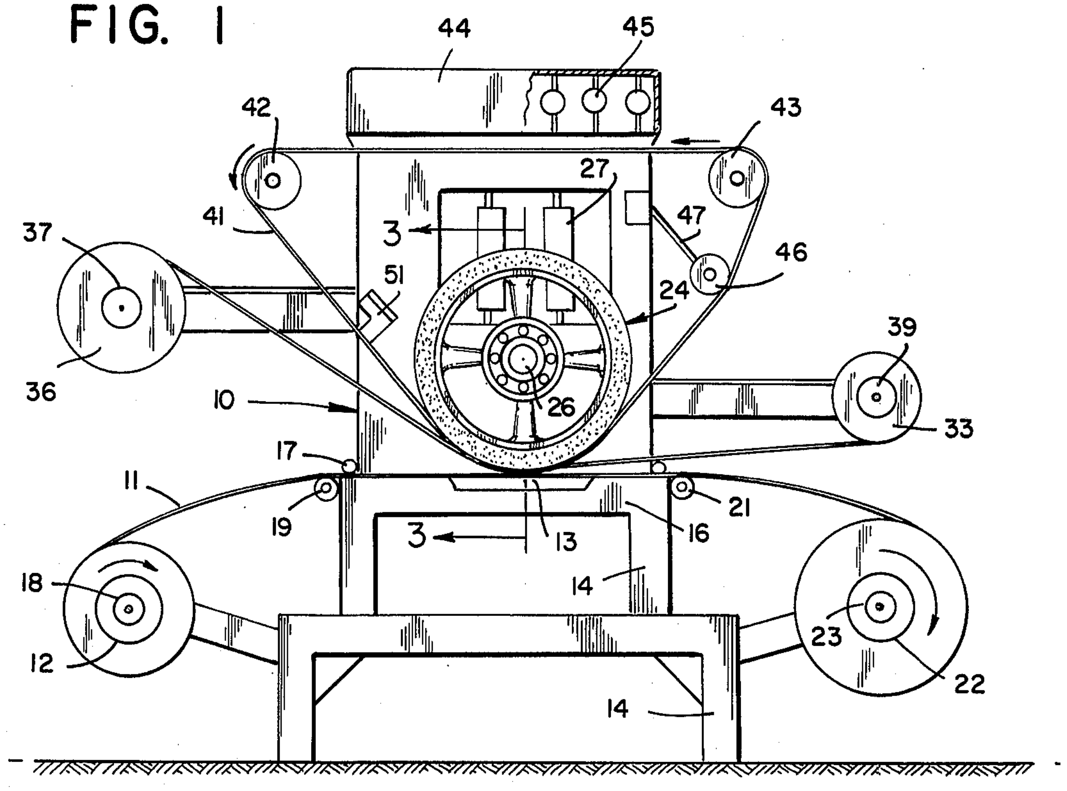
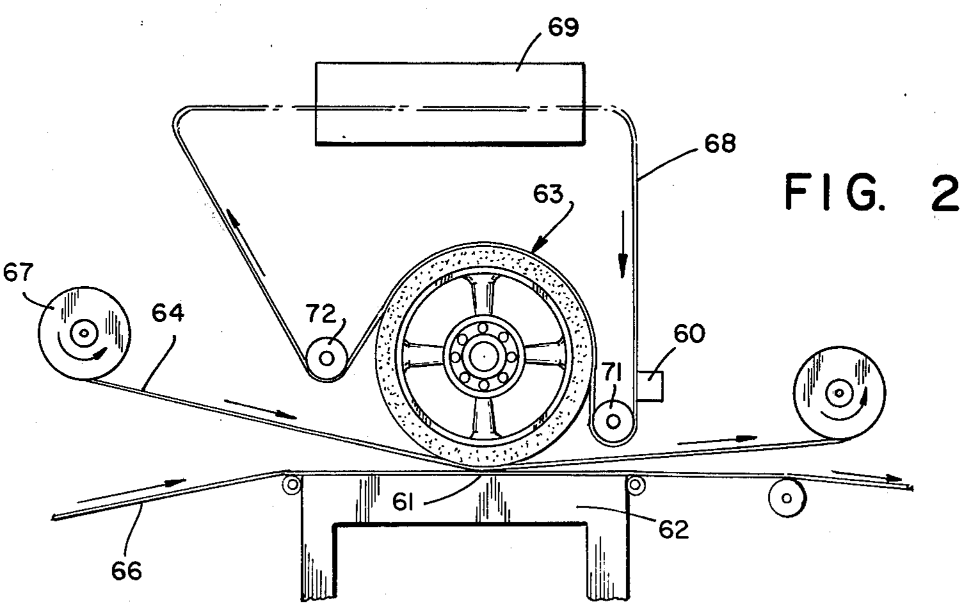
FIG. 2

FIG. 3
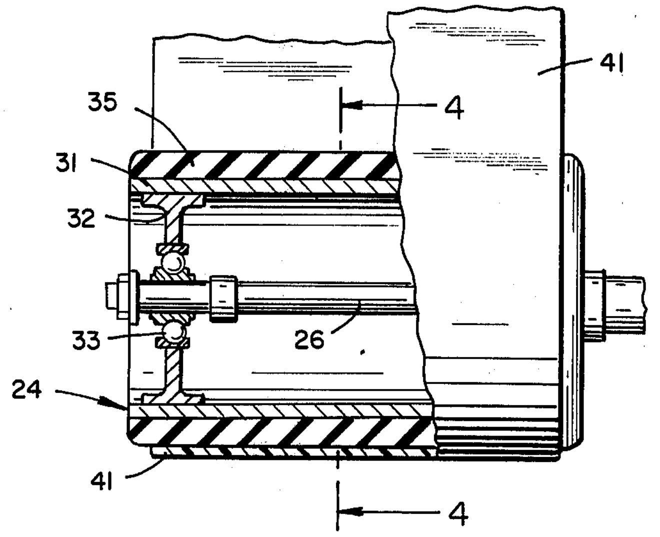
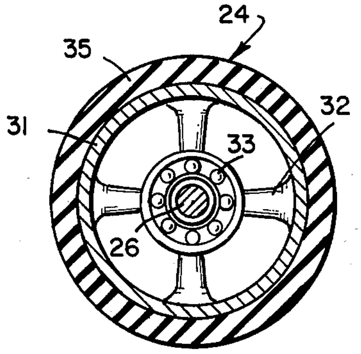
FIG. 4
FIG. 5
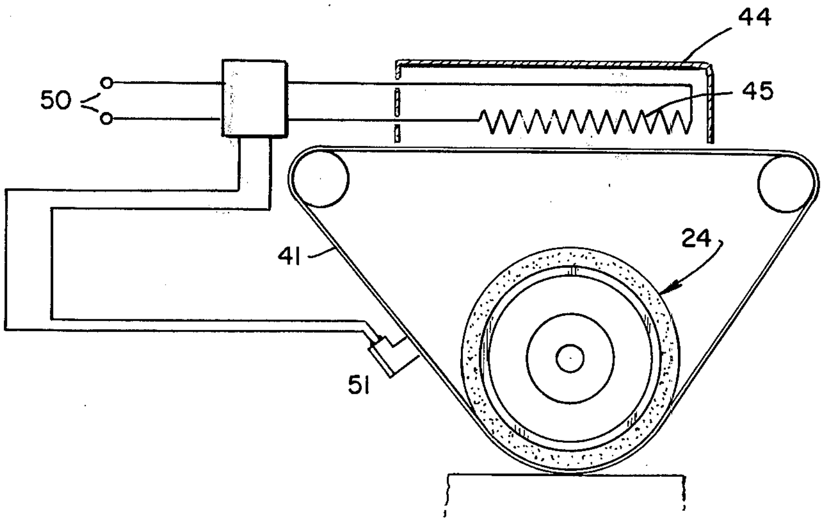

ROLL LEAF COATING APPARATUS

BACKGROUND OF THE INVENTION

Roll leaf or hot leaf stamping, or roll leaf coating, are relatively well known processes by which a product surface is provided with a trademark, other decorative motif, or protective topcoat. The process provides essentially that a transfer color or design is brought into contact with a product to be coated in the presence of sufficient heat and pressure to assure transfer of the design onto the product surface.

The process involves the use of a particular transfer material generally referred to as a stamping foil or roll leaf. As hereinafter referred to the foil or roll leaf itself normally comprises a composition of several materials involving different metals such as aluminum, gold, silver, chromium, as well as different colors and designs.

A characteristic foil which is used in the hot stamping process will consist primarily of a thin, plastic carrier film, normally polyester or the like. One surface of the carrier film is provided with a sensitive release agent or resin material.

A protective layer or coating is next applied to the heat sensitive release agent. Thereafter one or more layers of the decorative materials are usually applied by vapor deposition. As noted, these layers can consist of a suitable metal such as aluminum, chromium or the like. They could also comprise solid pigments or multi-colored designs.

The decorative layers are next covered with a thickness of a sizing coat comprising a heat sensitive adhesive. This latter thickness will serve to bond the one or more decorative coats to the product surface being treated.

It is understood that many different effects can be produced through the proper combination of colors, metals and the like. In any instance, the decorative layers will be adhered or bonded to the treated surface whereby to give the latter a desired appearance such as that of wood grain, decal or the like.

Operationally, the foil and the product to be decorated are aligned and brought into contact at a transfer station in a machine or appropriate coating fixture. When subject to sufficient release temperature the roll leaf or decorative layers will be separated from the carrier material. Concurrently, the pressure applied at the transfer station, whether by a roll or by a specifically shaped die, will cause the transfer of the roll leaf or decorative layer and its bonding material to the product surface.

A characteristic of the pressure applying surface is such that it will embody a degree of resiliency or yieldability. This feature will account for any irregularities in the surface to be coated. Thus, the pressure applying roll, when the latter is used, must be capable of withstanding the necessary heat as well as the pressure required to perfect the transfer to the product surface.

One type of roller which is found to be acceptable to the purpose is embodied in a cylindrical core to which a silicone rubber coating surface is bonded. To function properly, the roller's outer contact face must be sufficiently thick to maintain the desired degree of resiliency. Depending on the particular application to which the roll is required, this outer layer on the roll can be between 1/32 to ½ inch thick.

A further consideration in roll design, however, is the need to raise the contact surface to a temperature level necessary to effect separation of the decorative layer from the carrier material by melting the release agent. The roll is therefore usually provided with both external and internal heating elements normally electrically powered.

Operationally, some of these elements which function as the secondary heat source, must be of sufficient size and capacity to fit within the roll core and yet bring the roll peripheral surface to the required release agent melting temperature. In so doing, however, over a period of time the elevated temperature will eventually lead to the physical deterioration of the rubber, and its eventual separation from the metallic core.

Aside from the deleterious effect of heat on the roll's silicone rubber, the relatively thick layer mandates a greater power requirement. For example, while achieving a desired temperature at the roll surface, the layer itself exhibits a relatively steep temperature gradient. It is therefore necessary, that to maintain a predetermined peripheral temperature, the inner surface of the roll's rubber layer be made considerably hotter than the exposed periphery.

Silicone rubber, although determined to be effective in this thermal transfer process, is also a poor conductor of heat. It is known for example that for each 0.030 inches of silicone rubber thickness, there is a 25° F. temperature drop. Therefore, to maintain a consistent surface temperature at the roll's working area, the heat generating source must be of a capacity as dictated by the thickness of the poor heat conductive rubber layer.

Another prevalent operational defect which is encountered in pressure applying rolls of the typical roll leaf coating apparatus, resides in the rapid deterioration of the roll's journal means. For example, as is most normally employed, needle or roller bearings are mounted to each end of the pressure applying roll to assure a minimal degree of friction as the roll is driven. However, since the rolls, as noted will be heated from within, the end bearings will normally operate at a relatively high temperature.

Not only will prolonged exposure to such an environment and physical climate deteriorate lubricating fluid in the bearings, but it will also initiate strains, particularly in the instance of needle bearings. Further, any such deterioration in the quality of the bearings will be reflected in inaccuracies in the roll leaf transfer operation.

Toward overcoming the above stated problems, particularly with respect to operation of the pressure element, the present invention provides a novel means for supplying sufficient and accurate heat to facilitate transfer of roll leaf layers at higher speeds and productivity rates.

The apparatus presently disclosed for achieving the above includes a flexible, thermal belt which defines a closed loop. A belt drive means causes the belt to be guidably moved through a preset heating and cooling circuit. At least one part of the circuit is provided with a heater element bank or heat source, to bring the belt within a desired temperature range.

The driven belt is roller guided to be brought while in maximum heated condition, into heat exchange engagement with at least a portion of the peripheral surface of the roll or pressure element. While contiguous surfaces of the rotating roll and the belt are in contact, a desired heat flow will take place from the belt directly to the roll surface.

It is therefore an object of the invention to provide an improved roll leaf coating apparatus of the type contemplated. A further object is to provide a thermal belt which is utilized to transfer sufficient heat, whereby to effect separation of a roll leaf or decorative layer from its carrier, and to insure its application to the product surface. Another object is to provide an accurately temperature controlled thermal belt for establishing a proper atmosphere in which to transfer a roll leaf or decorative layer to a product surface. A still further object is to provide a means for effecting a transfer of heat to a pressure roll, whereby to most efficiently utilize the minimal amount of heat available and thereby reduce the power requirements of the overall operation.

DESCRIPTION OF THE DRAWINGS

In the drawings,

FIG. 1 is a front elevation view of an apparatus embodying the present invention.

FIG. 2 is similar to FIG. 1 illustrating an alternate arrangement of the thermal belt.

FIG. 3 is a cross-sectional view taken along line 3—3 of FIG. 1.

FIG. 4 is a cross-sectional view taken along line 4—4 in FIG. 3.

FIG. 5 is an electrical schematic drawing.

Referring to the drawings, FIG. 1 illustrates a preferred embodiment of the invention wherein an elongated strip product is decoratively coated on one surface. The decoration is such as, for example, a simulated wood grain or other pattern which is applied to the surface. It is understood that while the surface to be coated is noted to be a continuous strip, individual units can be similarly treated and coated.

As noted herein the foil and the product strip are preheated to a sufficient temperature to assure full separation of the roll leaf and its reception on the product. With the foil, and the product surface in contact, a predetermined pressure is applied by a resilient faced driven roll to effect the transfer.

The decorative layer or leaf material will thus in one step become physically separated and transferred onto the product. Concurrently, a transparent protective coating or layer can if necessary be applied to cover the decorative layer.

Again referring to FIG. 1, the latter embodies a mechanism or apparatus 10 particularly adapted for decorating the surface of a relatively thin strip product 11. In this instance, the thickness and character of the strip is such that it can be rolled onto a reel 12 or the like. It is thereafter readily fed into transfer station 13 of the apparatus. The apparatus basically includes a supporting framework 14 formed of structural members which are so arranged and shaped to best accommodate the various interacting components of the apparatus.

The material or product to be coated is fed onto a platform 16. The latter, as shown, can include a rigidly mounted platen having guide means 17 to accommodate and guide the moving strip. While the present platform 16 is shown as being a fixed or stationary member, a similar function can be achieved by a dynamic or articulated platform such as a rotatable table. The latter would include a plurality of stations which are sequentially brought into registry with transfer station 13.

Still another form of a suitable platform embodies the use of a chain belt or the like which functions to carry the product to be coated into the transfer station. Such a belt can adopt the form of a chain-like arrangement which is connected to a suitable variable speed drive. Thus, the chain's speed and movement can be regulated in accordance with other factors which will be hereinafter noted.

The product to be coated 11, as noted, is shown as embodying an elongated, thin strip. The latter, initially wound onto reel 12 is rotatably positioned on a spindle 18 or the like, to one side of platform 16. Spindle 18 can be freely mounted or even provided with a brake mechanism to best regulate the feed rate with which the strip product is drawn from reel 12.

Strip product 11 is led across first guide roller 19, onto the transfer station 13. It thereafter passes from the latter by way of a second guide roller 21, onto a take-up reel 22. The latter is similarly mounted to a spindle 23 which in turn can be connected to a drive or reel-in mechanism. The drive mechanism is adjustable to permit the feed of the strip to be regulated as required in accordance with speed of transfer.

Should the need arise for cooling the decorated strip after being coated, and before being wound onto reel 22, the product can be passed through a cooling element or station. Alternately, it can be drawn for a greater distance to allow for self cooling, before being applied to wind-up reel 22.

One embodiment of pressure element 24, as shown in the instant arrangement, comprises a relatively soft surfaced roller. The roller longitudinal axis is aligned parallel to transfer station 13, and substantially normal to movement of the product strip 11.

Pressure roller 24 is rotatably journalled to a driven, overhung spindle 26. The latter depends from a variable speed drive unit not presently shown. Thus, the pressure roll speed can be varied in accordance with existing transfer conditions and requirements.

Spindle 26 is operably positioned by hydraulic cylinders 27 or by similar adjusting means such that it can be continuously or periodically raised from and urged into transfer station 13 to exert a desired pressure. Roller 24 as shown in FIGS. 3 and 4, is structured basically of a tubular metallic core 31 having end bearing cages 32. The core outer or contact surface 35 is formed of a soft, yet durable heat resistant material.

One material found to be particularly desirable as making up the roller surface 35 is silicone rubber. The latter need be only of sufficient thickness to apply the needed resilient, compressive force during the transfer period. Such an arrangement permits the inside, as well as the periphery of roller 24 to be maintained relatively cool and thus preserve the integrity of the peripheral surface.

Pressure roller 24 is journalled at two or more points, preferably at its opposite ends, to spindle 26 by spaced apart bearings 33 such as carried in bearing cage 32. The latter are so positioned that the natural air flow will tend to keep the bearings cool and thereby preserve them from thermal damage.

The foil supply carried on the apparatus is preferably wound onto a reel 36. The latter is in turn supported on an idler spindle 37 mounted to one side of pressure roll 24. As herein noted, as the foil strip unwinds from reel 36, it registers in transfer station 13 between the pressure roll 24 and the surface to be coated.

The foil strip is further guided by the periphery or roll 24, and aligned with the product strip 11. Thus, transfer of the decorative layer from the foil to the product strip is readily achieved.

The foil carrier member remaining subsequent to the transfer operation is rewound on a wind-up reel 38. The latter is mounted to a driven spindle 39 such that the wind-up speed can be adjusted and coordinated with the machine speed.

The heat requirement to achieve separation of the foil and transfer to the product surface, is supplied to transfer station 13 as well as to the pressure roll 24, by a thermal belt 41. The latter, as shown, defines a closed loop around the roller 24, being threaded on a series of guide rolls including rolls 42 and 43. The closed loop is further positioned such that belt 41 during its transverse, is brought into contact with a heat source or element 44.

Since pressure roller 24 is controllably movable in a vertical direction, the closed belt 41 in its circuit can be provided with at least one take-up member. An embodiment of the latter includes a spring biased take-up roll 46 which is pivotally mounted to the machine frame 14 by a movable arm 47.

Heater 44 is disposed in a position such that the thermal belt 41 is readily brought into heat exchange contact therewith during the belt's circuit. Said heater 44 as shown, is disposed at the upper end of frame 14 being mounted to conveniently accommodate belt 41 as the latter is driven through its closed circuit.

The heat source 44 can take any one of a number of embodiments adaptable to the present purpose. These include a series or bank of electrical heater elements 45, steam heated units, radiant heaters, or the like. For most practical and efficient purposes, the heating elements are confined within a casing, partial enclosure or the like.

During the residence time of belt 41 as it passes through heater 44, it is brought to a temperature sufficient to achieve its desired function at transfer station 13. Thus, heater elements 45 can be provided with suitable modulating means such as a baffle, a movable vane, or other means for deflecting at least some of the heat away from belt 41.

The heater elements 45 can alternately be provided with means for adjusting the level of heat transfer by varying the electrical energy input thereto. In either instance, the heat requirement needed to separate the foil, can be closely regulated. Further, because the belt is so thin, it will not act as a heat sink. To the contrary, the belt will exhibit great sensitivity to thermal change; consequently its temperature on leaving heater 44 can be closely regulated.

As shown, thermal belt 41 which defines the closed heating loop, is formed of a material capable of being heated to a desired elevated temperature by exposure to heat source 44. A belt adapted to this purpose can be formed of a number of materials or combinations of materials so long as the belt remains relatively pliable and thermally stable at elevated temperatures. It can thus be bent about the respective guide rollers whereby to in effect convey heat from heater 44, to roller 24, and thence to transfer station 13.

In one embodiment, thermal belt 41 can be formed of thin metal, or of a suitable thermally non-plastic which is capable of functioning at the normally high operating temperature. Further, the belt can be formed of a combination of materials including asbestos, fiber glass, silicone rubber and the like. In any event, the belt is preferably designed to operate without exhibiting serious deterioration at temperatures of about 1700°. It must also be capable of substantially maintaining its physical characteristics while continuously passing through a constant heating and cooling cycle as it progresses through the various parts of its heat transfer loop.

Toward maintaining the temperature at the roller 24 surface within a narrow range of values, a thermal sensor member 51 is positioned at a point along the belt's loop to contact sense the belt surface, and continuously monitor the temperature thereof. As shown in FIG. 1, temperature monitor 51 can be positioned immediately upstream of transfer station 13 where it can sense the belt temperature just before the latter comes into contact with roller 24.

Thermal sensor 51 is thus preset, and integral with the electrical energy source 50 to heater 45, to regulate operation of the latter. Should mechanical means be utilized by the heat meter for modulation, it, too, can be adjusted in response to the temperature at sensor 51.

In an alternate embodiment of the apparatus, and as shown in FIG. 2, the essential elements there shown are primarily as described with respect to the embodiment of FIG. 1. Notably transfer station 61 at which the decorative layer is applied to the product 66 surface, is defined between platform or stationary platen 62 and a rotatable pressure roll 63.

In a similar manner, the roll leaf or foil 64 is unwound from reel 67 and is passed through the transfer station in contact with both pressure roll 63 and the product 66 to which the decorative coating is being applied.

The heating arrangement, however, for bringing the surface of pressure roller 63 to the desired temperature is provided through thermal belt 68. The latter is positioned to contact roller 63 in a manner that a greater amount of the roller peripheral surface is exposed to the heating.

Thus, belt 68, after passing through the heater 69, is guided around a lower belt guide pulley 71, and into contact with the surface of the pressure roll 63. Said surface, as shown, is remote from, and not in contact with station 61. After the heat transfer period is completed, belt 68 is again led away from the pressure roller and continued on its closed loop through a second guide roll 72.

In this arrangement it is seen that the basic operation of heating pressure roll 63 is similar to that shown in FIG. 1, including the monitoring of belt 68 at sensor 60. However, the disposition of rollers 71 and 72 which guide belt 68 in this arrangement, is such that the extent of surface along which belt 68 contacts the pressure roller 63, can be varied. Thus, either of the said guide rollers 71 or 72 can be adjusted to position more or less of the belt 68 in contact with the roller 63 surface.

Other modifications and variations of the invention as hereinbefore set forth can be made without departing from the spirit and scope thereof, and therefore, only such limitations should be imposed as are indicated in the appended claims.

I claim:

1. Apparatus for applying a decorative roll leaf to the surface of a product 11, from a foil comprising a carrier strip having said decorative roll leaf detachably adhered with a thermally meltable adhesive to one side thereof, which apparatus includes;

a platform 16 adapted to support said product 11, a pressure member 24 having an outer surface positioned adjacent to said platform 16 and being operable to exert a force in the direction of the latter, and to define a transfer station 13 therebetween, product handling means positioned adjacent to said transfer station whereby to guide said product into said station, foil transfer means 37, 39 positioned to introduce said foil into said transfer station 13 and into registry with said product 11 surface, a thermal belt 41 defining a closed loop, a heat source 44, belt guide means engaging said thermal belt 41 to progress the latter along said closed loop, and to guide a belt section sequentially into heat exchange relationship with said heat source 44, and thence into heat exchange contact with at least a part of the outer surface of said pressure member, whereby to melt said adhesive and to cause separation of said decorative roll leaf from said carrier strip and transfer thereof to the product surface at said transfer station 13.

2. In an apparatus as defined in claim 1, wherein said heat source includes; means for modulating the rate of heat exchange between said heat source and said thermal belt.

3. In an apparatus as defined in claim 1, including; thermal sensor means positioned contiguous with said thermal belt to monitor the temperature thereof.

4. In an apparatus as defined in claim 3, wherein said thermal sensor means 51 is disposed adjacent to said closed loop whereby to monitor the temperature of said belt at a point intermediate said heat source and said transfer station.

5. In an apparatus as defined in claim 1, wherein said heat source includes; at least one electric heater connected to a source of electrical current, and said thermal sensor means is connected to said at least one electric heater whereby to regulate the flow of electric current thereto in response to the belt temperature.

6. In an apparatus as defined in claim 1, wherein said heat source includes; at least one heatable member, and a heat deflecting element operably positioned between said heatable member and said thermal belt to regulate the flow of heat which passes from said member to said belt.

7. In an apparatus as defined in claim 1, wherein said belt guide means includes; at least one spring biased roller 46 disposed in engagement with said belt and being operable to maintain a desired tension in the latter.

8. In an apparatus as defined in claim 1, wherein said pressure member includes; a rotatably mounted roller having a resilient peripheral surface.

9. In an apparatus as defined in claim 1, wherein said pressure member includes; a rotatably mounted roller, having a resilient peripheral surface, and said thermal belt being disposed in rolling engagement with said resilient surface.

10. In an apparatus as defined in claim 1, wherein said thermal belt is guided intermediate said pressure member, and said platform, whereby to contact and to transfer heat into said foil.

11. In an apparatus as defined in claim 1, wherein said belt is guided into engagement with a portion of the pressure member 24 outer surface which does no contact said platform.

12. In an apparatus as defined in claim 11, wherein said belt guide means includes; at least one guide roller being operably positioned to adjust the area of contact between said thermal belt and said roller resilient surface.

13. In an apparatus as defined in claim 1, wherein said thermal belt is formed of a thin material which is thermally stable at elevated temperatures.

14. In an apparatus as defined in claim 1, wherein said thermal belt is formed of silicone rubber.

* * * * *